(12) United States Patent
Hu

(10) Patent No.: US 11,428,288 B2
(45) Date of Patent: Aug. 30, 2022

(54) LEG ASSEMBLY, AND SHOCK ABSORPTION MECHANISM FOR POLE

(71) Applicant: NINGHAI XINGDA LEISURE PRODUCTS CO., LTD., Zhejiang (CN)

(72) Inventor: Jinxue Hu, Zhejiang (CN)

(73) Assignee: NINGHAI XINGDA LEISURE PRODUCTS CO., LTD., Zhejiang (CN)

( * ) Notice: Subject to any disclaimer, the term of this patent is extended or adjusted under 35 U.S.C. 154(b) by 323 days.

(21) Appl. No.: 16/848,854

(22) Filed: Apr. 15, 2020

(65) Prior Publication Data

US 2021/0156444 A1   May 27, 2021

(30) Foreign Application Priority Data

Nov. 22, 2019 (CN) .......................... 201911157517.0

(51) Int. Cl.
*F16F 3/087* (2006.01)
*A45B 9/04* (2006.01)
*A63C 11/22* (2006.01)

(52) U.S. Cl.
CPC ................ *F16F 3/087* (2013.01); *A45B 9/04* (2013.01); *A63C 11/227* (2013.01); *A63C 2203/20* (2013.01)

(58) Field of Classification Search
CPC ... A63C 11/22; A63C 11/227; A63C 2203/20; A45B 9/04; F16F 3/087
See application file for complete search history.

(56) References Cited

U.S. PATENT DOCUMENTS

| 9,226,556 | B1 * | 1/2016 | Chien | A61H 3/0288 |
| 10,856,630 | B1 * | 12/2020 | Hu | A45B 9/00 |
| 2010/0170548 | A1 * | 7/2010 | Lenhart | A63C 11/221 |
| | | | | 280/823 |
| 2013/0146110 | A1 * | 6/2013 | Heim | F16F 7/00 |
| | | | | 135/65 |
| 2015/0059816 | A1 * | 3/2015 | Kim | A45B 9/00 |
| | | | | 135/75 |
| 2019/0104814 | A1 * | 4/2019 | Bullard | A45B 9/04 |

FOREIGN PATENT DOCUMENTS

| CN | 201088205 | 7/2008 |
| CN | 204364805 | 6/2015 |

* cited by examiner

*Primary Examiner* — Brian L Swenson
(74) *Attorney, Agent, or Firm* — JCIP Global Inc.

(57) ABSTRACT

A leg assembly, and a shock absorption mechanism for a pole are provided. The shock absorption mechanism comprises a pole body and a leg assembly, wherein the leg assembly comprises a support leg, a tray surrounding the support leg, and a connecting sleeve for connecting the pole body inserting from the top of the support leg. When a bottom of the pole body is inserted into the connecting sleeve and tightly resists against the elastic limiting clamps, the elastic limiting clamps will be pushed outward and limited in the guiding slots of the support leg, so that the connecting sleeve with the pole body can move upward and downward relative to the support leg. There is a mounting space for the shock absorption spring between the support leg and the connecting sleeve, and the support leg has a trend of moving downward due to resistance from the shock absorption spring.

14 Claims, 16 Drawing Sheets

LEG ASSEMBLY, AND SHOCK ABSORPTION MECHANISM FOR POLE

CROSS-REFERENCE TO RELATED APPLICATION

This application claims the priority benefit of China Application serial no. 201911157517.0, filed on Nov. 22, 2019. The entirety of the above-mentioned application is incorporated here by this reference and made a part of this specification.

BACKGROUND

Technical Field

The present application relates to the technical field of poles, and in particular to a shock absorption mechanism for a pole and a leg assembly, which are applicable to various poles such as mountaineering poles, ski poles and hiking poles.

Description of Related Art

The existing poles such as mountaineering and ski poles are mainly used to aid walking and provide support. With the people's deeper understanding of health, people pay more and more attention to the experience in outdoor sports. Conventional poles do not have a shock absorption function when in use, so that they are in rigid contact with the ground, and thus it is extremely possible to shock hands and other parts of the body, bringing some regrets to people when enjoying outdoor sports.

At present, there are some poles with the shock absorption function in market, which are generally classified into two categories. In the poles of the first category, an elastic mechanism is arranged at the handle, but such poles are not compact and light enough, and are not user friendly. In the poles of the second category, an elongated hole is formed at a lower end of a metal tube or carbon fiber tube, a horizontal pin runs through the elongated hole to be connected to an external support leg, and a spring is supported between the support leg and the lower end of the tube. Such a structure is somewhat light, but still has some disadvantages: first, since it is necessary to form the elongated hole by stamping the metal tube or the carbon fiber tube, it is unfavorable to manufacture; second, due to the addition of the stamping process, the production steps are increased, and the processing cost is thus increased; and third, due to the formation of the elongated hole on the metal tube or the carbon fiber tube, the strength of the tube is reduced, and the service life of pole is shortened.

Chinese Patent CN201088205Y (Patent Application No.: 200720058870.X) disclosed a sock absorption structure for a foldable pole, wherein the pole includes a first pole section, a second pole section and an elastic drawstring; the elastic drawstring runs through central holes of the first pole section and the second pole section to maintain and connect the first pole section and the second pole section; an internal step is arranged in the central hole of the first pole section, and a compression spring is arranged in an accommodating groove of the second pole section mounted on a butt-joint end of the first pole section; the butt-joint end of the first pole section is butted with the compression spring, so that the second pole section and the first pole section float relatively in an axial direction; and, a clamping point formed on elastic drawstring exactly clamps the internal step of the first pole section, so that the elastic drawstring pulls the first pole section toward the second pole section when it is retracted. The foldable pole is simple in structure. However, since the first pole section and the second pole section are fixed by the drawstring and the spring, it is easy for the two pole sections to separate from each other if excessive force is applied thereto. Therefore, there are disadvantages of low connection firmness and low stability.

Another Chinese Patent CN204364805U (Patent Application No.: 201520063411.5) disclosed a multifunctional outdoor mountaineering pole, wherein the pole includes a handle; the handle is connected to a handle rear cover and a carbon pole; the carbon pole is connected to a telescopic pole, the telescopic pole is connected to a damping plate, and the damping plate is connected to an antiskid pole tip sleeve; an elastic antiskid grip is arranged on the carbon pole; and, a shock absorption spring is arranged on the telescopic pole. Herein, the shock absorption spring is mounted outside the telescopic pole, and it is unclear whether there is a support between the shock absorption spring and the damping plate. Therefore, no effective shock absorption can be provided.

SUMMARY

The present application provides a leg assembly which is compact with simple structure, facilitates assembly and provides superior shock absorption effect.

The present application also provides a shock absorption mechanism for a pole, which facilitates assembly and manufacture and provides superior shock absorption effect.

In an embodiment of the present application, the leg assembly comprises a support leg having an upper portion, a middle portion and a lower portion, a tray surrounding the support leg, a connecting sleeve for connecting the pole body inserting from the top of the support leg, and a shock absorption spring surrounding the connecting sleeve and resisting against the connecting sleeve and the support leg. The upper portion of the support leg is hollow and has multiple guiding slots at a peripheral surface of the support leg which arranged along a lengthwise direction of the support leg. The connecting sleeve has multiple elastic limiting clamps at a peripheral surface of the connecting sleeve corresponding to the guiding slots, so as to limit the connecting sleeve with the support leg. The shock absorption spring is located in a mounting space between the support leg and the connecting sleeve, and the support leg has a trend of moving downward due to resistance from the shock absorption spring. When a bottom of the pole body is inserted into the connecting sleeve and tightly resists against the elastic limiting clamps, the elastic limiting clamps will be pushed outward and limited in the guiding slots of the support leg, so that the connecting sleeve with the pole body can move upward and downward relative to the support leg.

In an embodiment of the present application, the upper portion of the support leg is for receiving the connecting sleeve and positioned with the connecting sleeve, a lower portion of the support leg is a grounded section, and the middle portion of the support leg has a cylindrical external threaded section connected to the tray, a cylindrical internal threaded connecting column is extended from a center of the tray corresponding to the middle portion of the support leg, and, the tray is adjustably screwed on the middle portion of the support leg.

In an embodiment of the present application, the upper portion of the support leg has an opening for receiving the connecting sleeve, the connecting sleeve has an inner hole for receiving the bottom of the pole body, and the elastic limiting clamps, each arranged along the lengthwise of the support leg, are capable of tight clamping the bottom of the pole body.

In an embodiment of the present application, the connecting sleeve has two elastic limiting clamps symmetrically arranged at a middle of the connecting sleeve, and the support leg has two guiding slots.

In an embodiment of the present application, each elastic limiting clamp has a limiting block arranged at a bottom of the elastic limiting clamp with a slant guiding surface, each guiding slot are longitudinally arranged at the upper portion of the support leg and close to the middle portion, the upper portion of the support leg has a truncated cone with an inner step at an inner wall of the upper portion of the support leg, and the connecting sleeve inserted inside the upper portion of the support leg is limited through resisting against the inner step and the limiting blocks blocked in the corresponding guiding slot.

In an embodiment of the present application, the connecting sleeve has a circular increased-diameter portion at a top end of the connecting sleeve, an inner diameter of the opening on the upper portion of the support leg is matched with an outer diameter of the circular increased-diameter portion, the support leg has a neck inside the upper portion and at a bottom of the truncated cone, forming the inner step, and, an inner diameter of the neck is matched with an outer diameter of the connecting sleeve.

In an embodiment of the present application, the shock absorption spring is outside the connecting sleeve, resisting against between the increased-diameter portion of the connecting sleeve and the inner step of the support leg.

In an embodiment of the present application, the diameter of the bottom of the pole body is gradually reduced; and correspondingly, the diameter of the inner hole of the connecting sleeve is gradually reduced.

In an embodiment of the present application, the tray includes a snow tray and a mud tray; the middle portion of the support leg has only one external threaded section to facilitate threaded connection and height adjustment of the mud tray or the snow tray, and, the internal threaded connecting column of the snow tray and the mud tray has an internal threaded section, when the mud tray or the snow tray is connected with the support leg, the internal threaded section of the mud tray or the snow tray is located above the external threaded section of the support leg.

In an embodiment of the present application, the tray includes a snow tray and a mud tray; the middle portion of the support leg has two separated external threaded sections to facilitate threaded connection and height adjustment of the mud tray or the snow tray; and, the internal threaded connecting column of the snow tray and the mud tray has an internal threaded section, when the mud tray is connected with the support leg, the internal threaded section of the mud tray is located between the two separated external threaded sections of the support leg; and, when the snow tray is connected with the support leg, the internal threaded section of the snow tray is located above the two external threaded sections of the support leg.

In an embodiment of the present application, a metal foot having a positioning column is disposed on the bottom of the support leg, the support leg has an inserting hole for receiving the positioning column of the metal foot at the bottom of the support leg; and, the positioning column on the top of the metal foot is inserted inside the inserting hole of the support leg.

In an embodiment of the present application, a metal knife-like tip is disposed on the bottom of the support leg with the lower portion of the knife-like tip exposed outside, the support leg has a positioning hole for receiving an upper portion of the knife-like tip at the bottom of the support leg. The support leg has a pin-hole running through the side wall of the positioning hole, while the knife-like tip has a positioning opening in a middle of the knife-like tip, and, a pin inserts from the support leg into the pin-hole and the positioning opening so as to fix the knife-like tip with the support leg.

In an embodiment of the present application, the knife-like tips is longitudinally symmetrical.

In an embodiment of the present application, the shock absorption mechanism for a pole comprises a pole body and the leg assembly mentioned above, wherein a bottom of the pole body is inserted into the connecting sleeve and clamped by the elastic limiting clamps, and the shock absorption spring disposed between the connecting sleeve and the support leg is configured to absorb shock on the support leg.

Compared with the prior art, the present application has the following advantages. The leg assembly includes a support leg, a tray and a connecting sleeve. The tray is a mud tray or a snow tray, and can be adjusted to a proper height through threads. The connecting sleeve is arranged in the support leg in a position-limited manner. The pole body is inserted into the connecting sleeve and clamped and fixed by the elastic limiting clamps, so that the connecting sleeve and the support leg are connected in such a way that they can move up and down. The shock absorption spring is supported between the connecting sleeve and the support leg to realize shock absorption. The knife-like tips can greatly improve the gripping effect in some occasions and can be reused after being inverted, so that the service life is prolonged. The present application is compact and simple in structure. The tube used as the pole body can be fixed by direct insertion without the formation of holes, so that the metal processing process is reduced, which facilitates manufacture and reduces cost, and the strength of the tube is improved without affecting the assembly and connection between telescopic tubes of the conventional pole. Moreover, the stability in use is high, and the shock can be effectively reduced due to the presence of the shock absorption function. The whole mechanism is relatively light, so the user's comfort in use is improved, and it is convenient to be assembled and suitable for being popularized in various pole structures.

DESCRIPTION OF THE EMBODIMENTS

Figure 1:
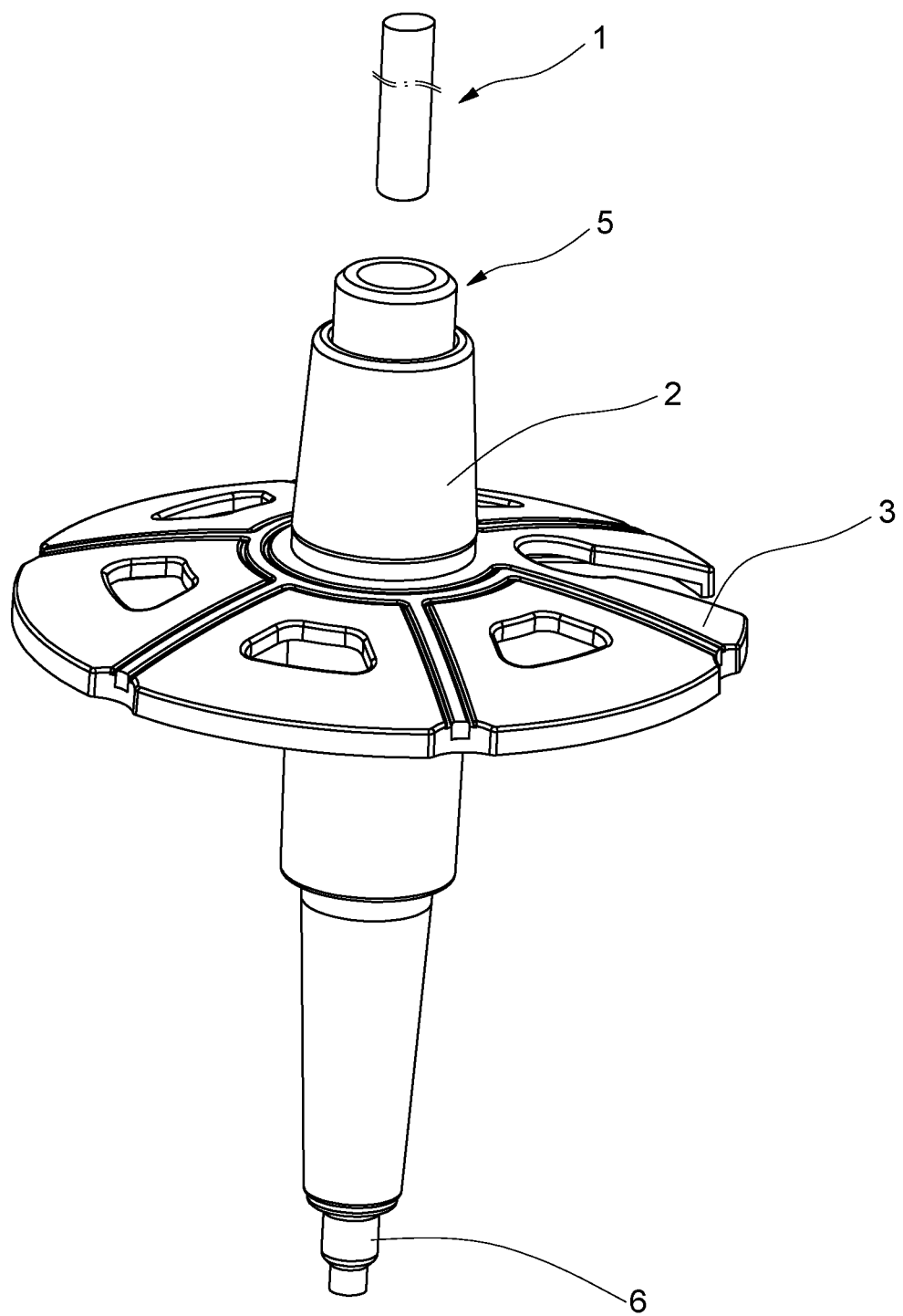
FIG. 1 is a perspective view of a leg assembly according to Embodiment 1 of the present application.
Figure 2:
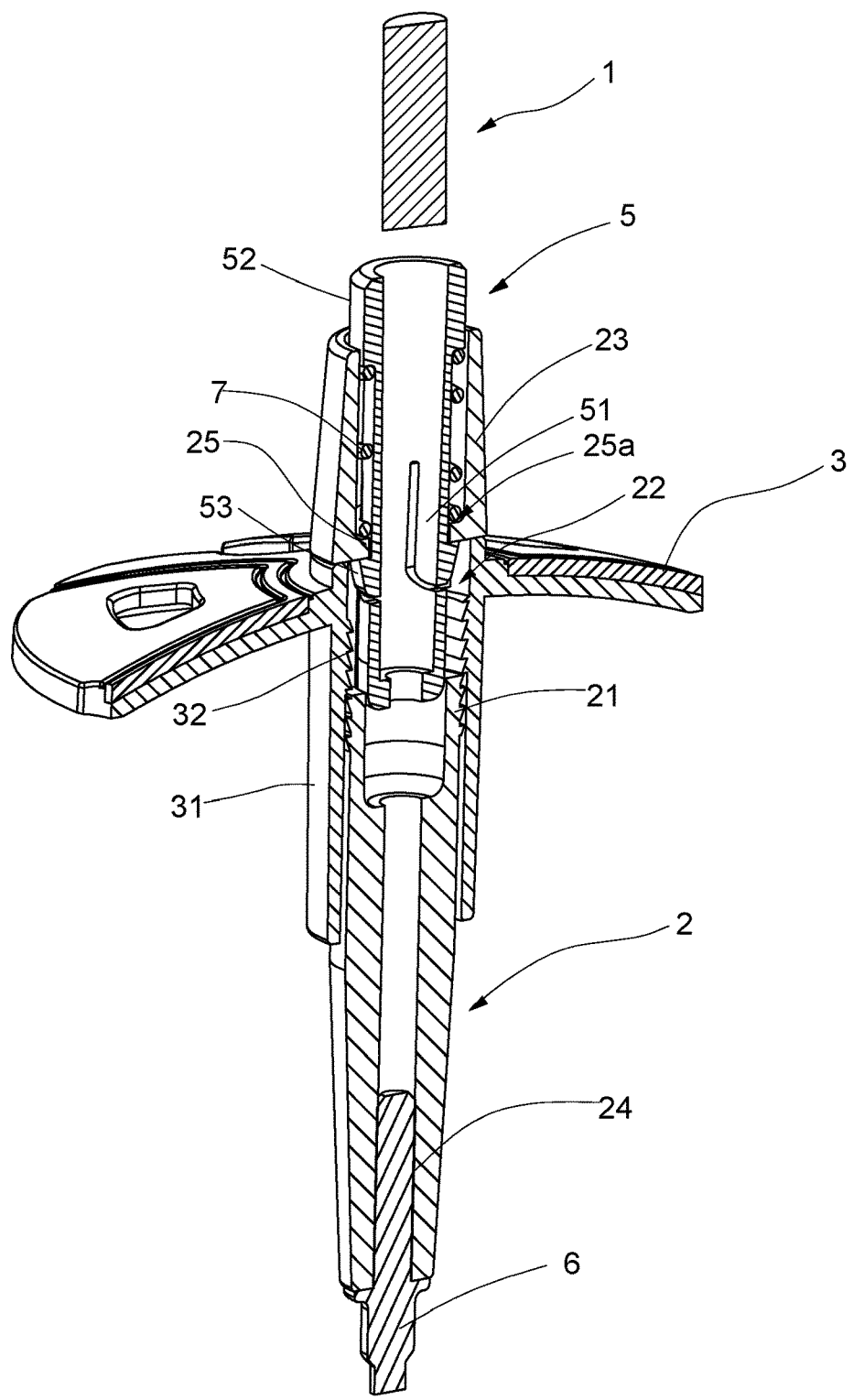
FIG. 2 is a sectional view of FIG. 1.
Figure 3:
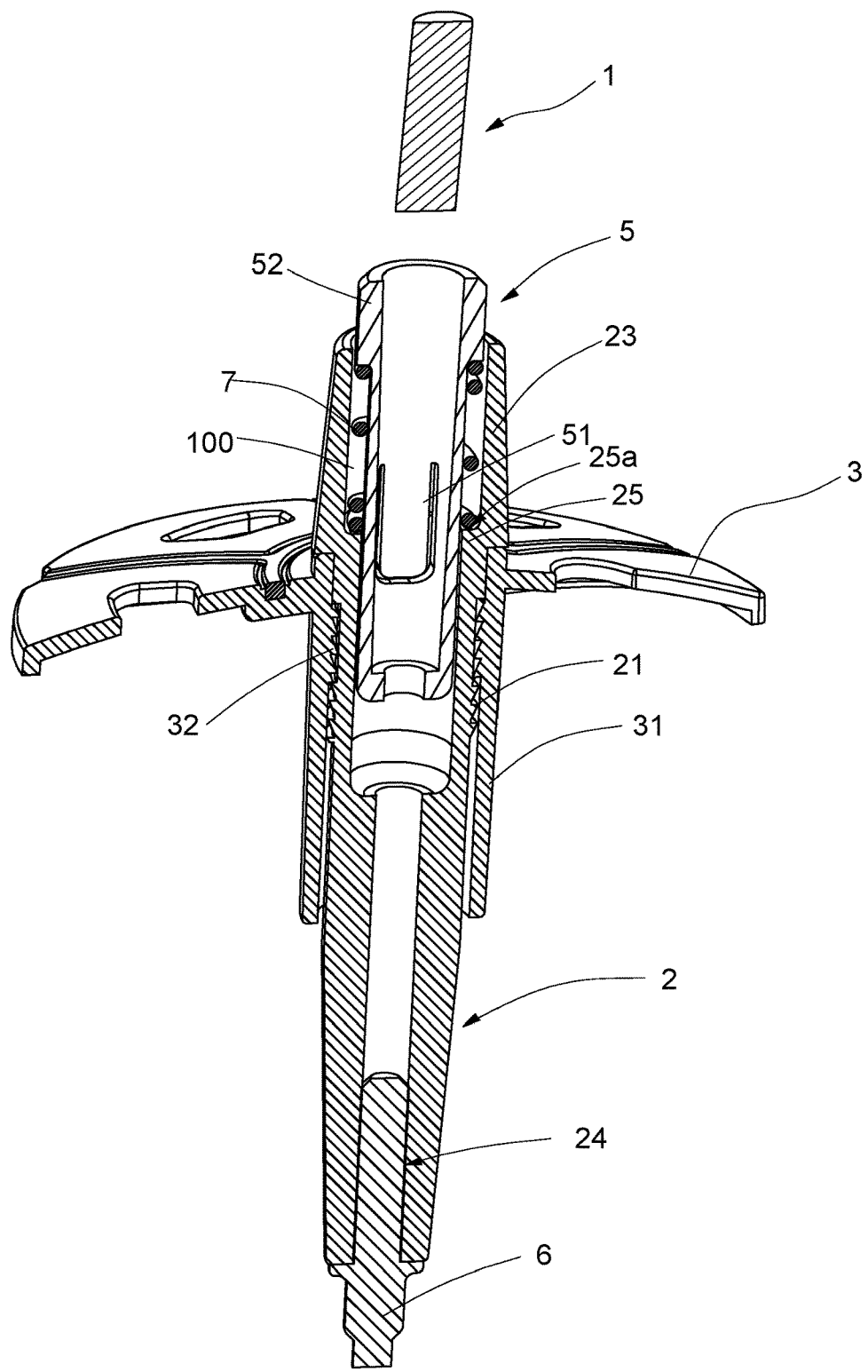
FIG. 3 is another sectional view of FIG. 1.
Figure 4:
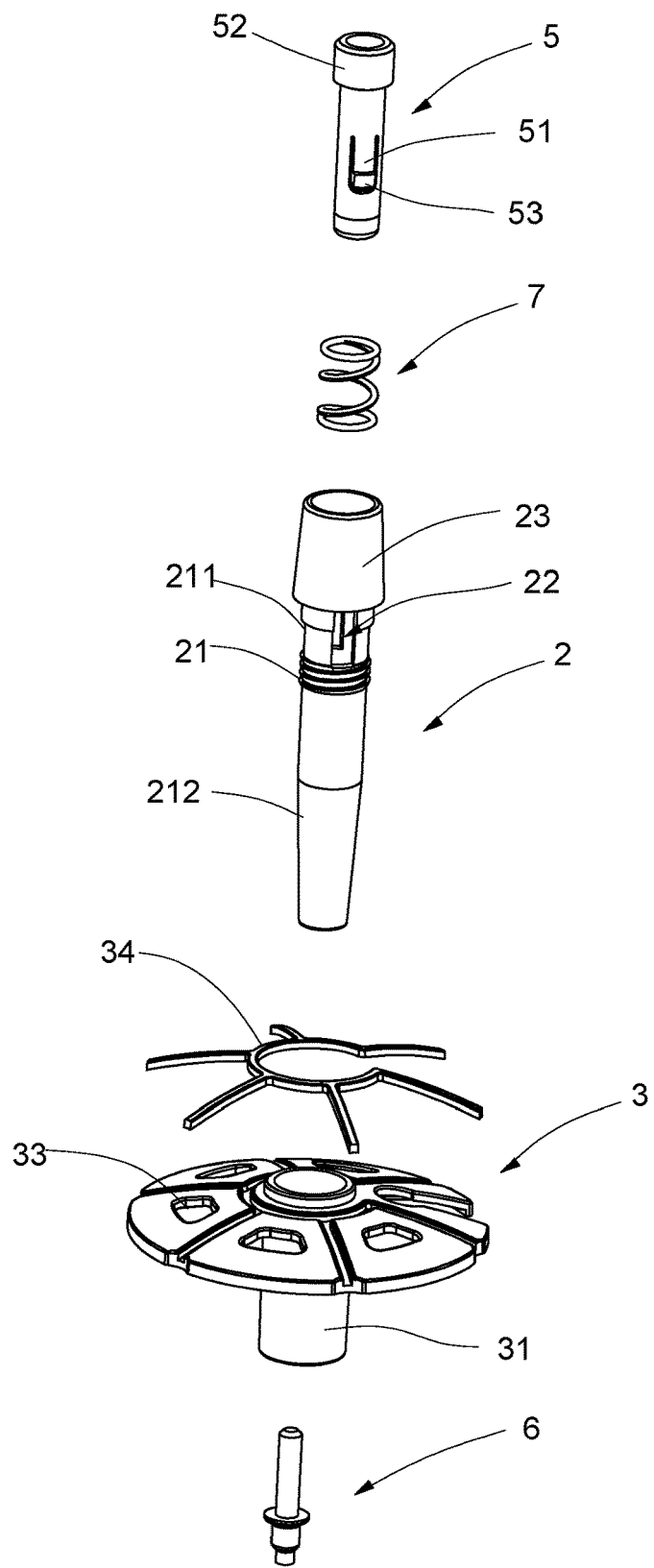
FIG. 4 is an exploded view of the leg assembly according to Embodiment 1.
Figure 5:
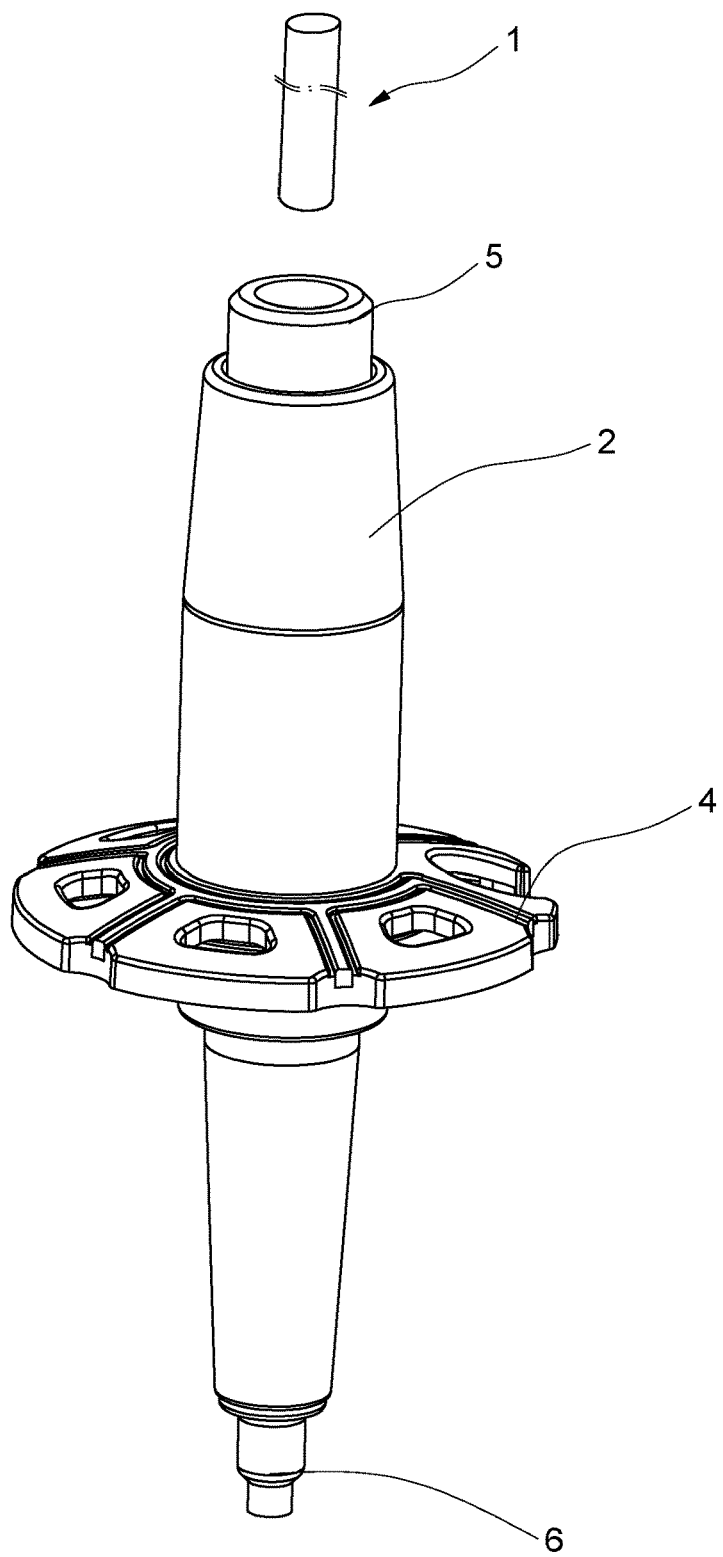
FIG. 5 is a perspective view of a leg assembly according to Embodiment 2 of the present application.
Figure 6:
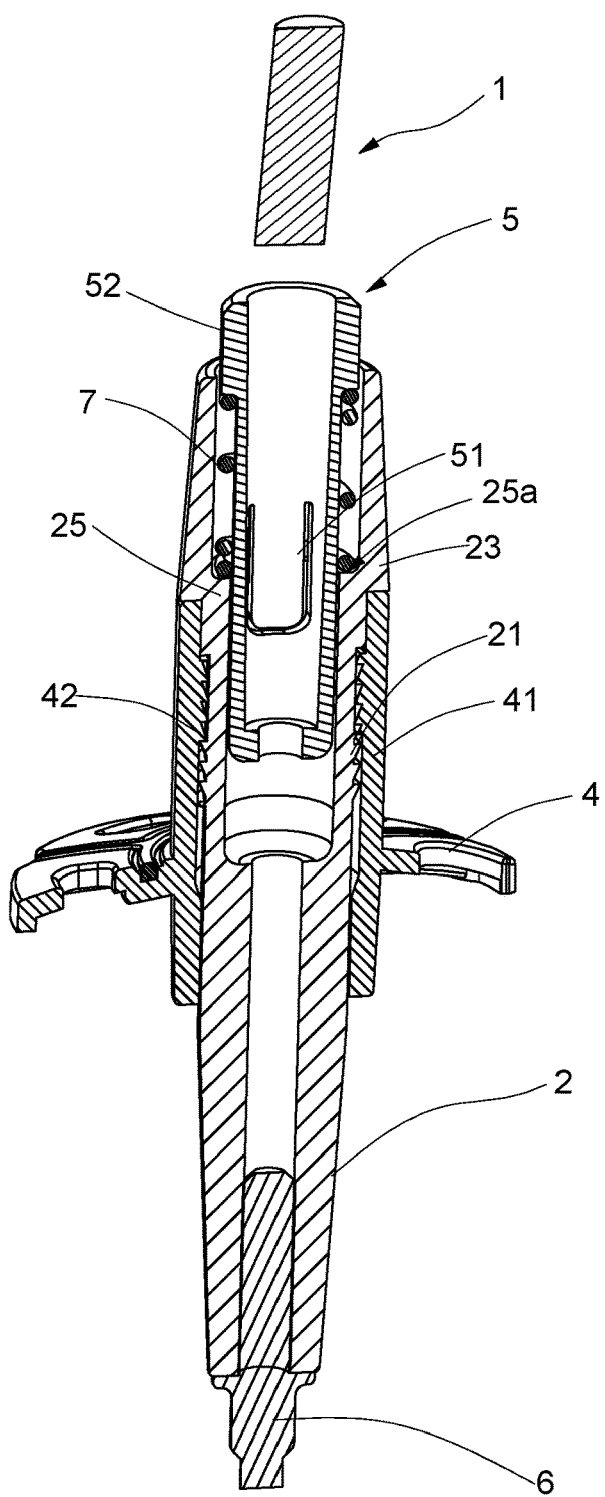
FIG. 6 is a sectional view of FIG. 5.
Figure 7:
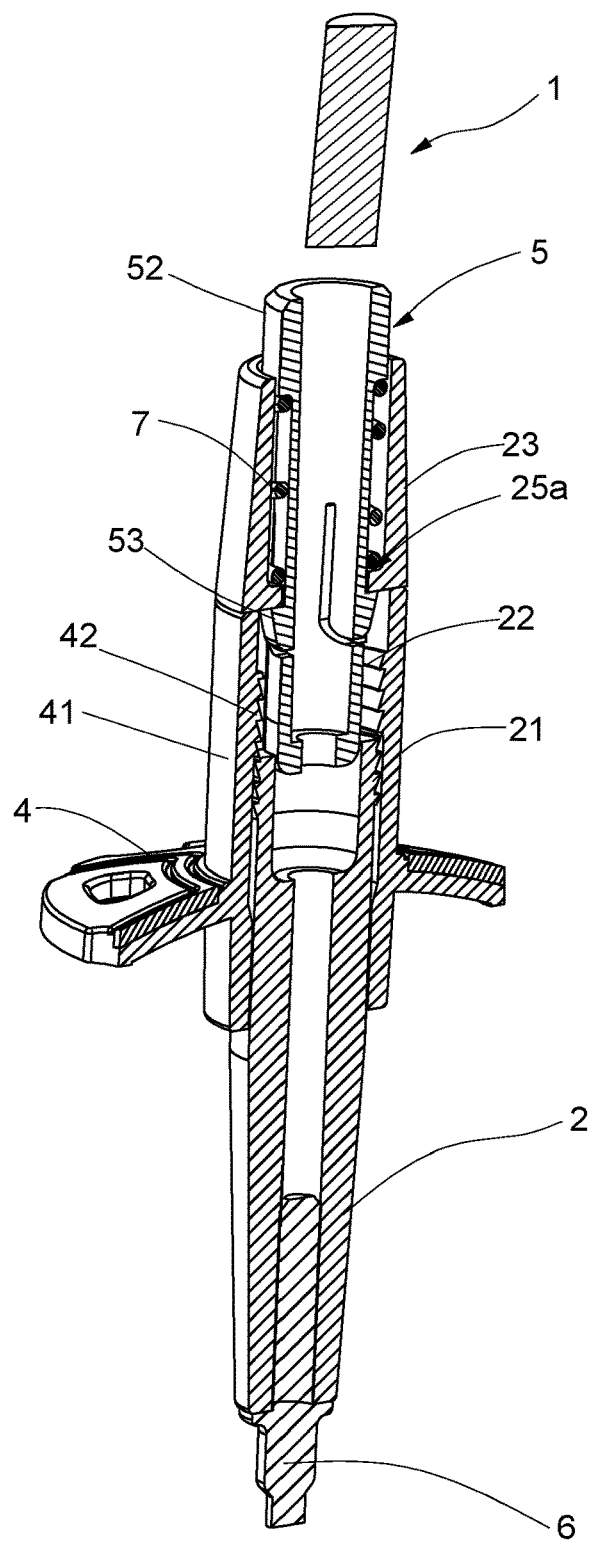
FIG. 7 is another sectional view of FIG. 5.
Figure 8:
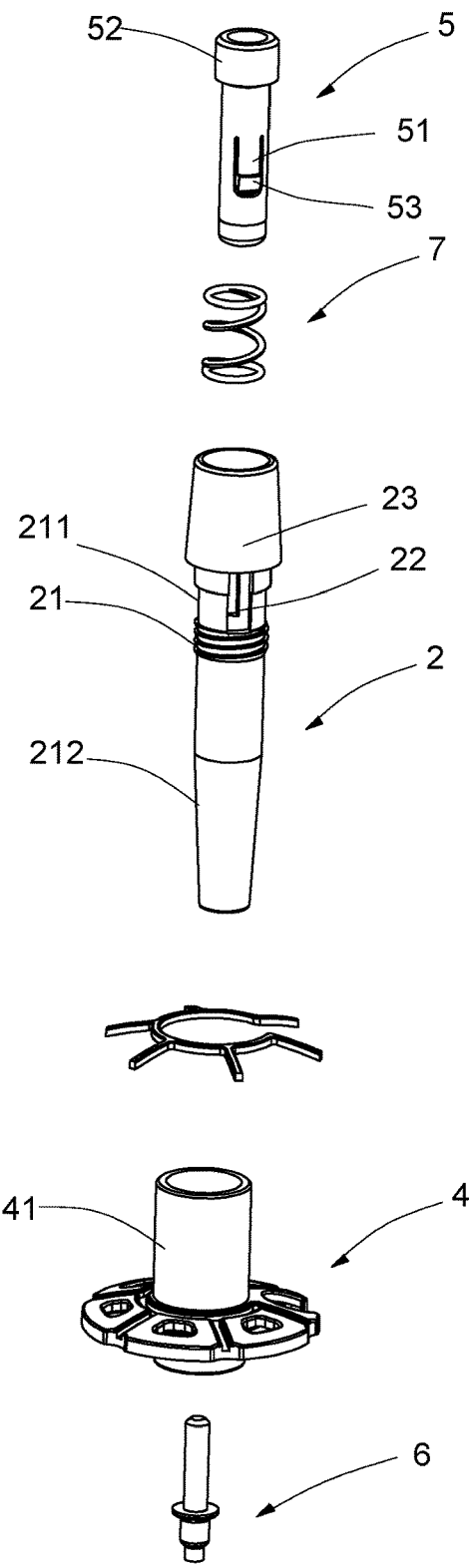
FIG. 8 is an exploded view of FIG. 5.

To enable a further understanding of the present application content of the application herein, refer to the detailed description of the application and the accompanying drawings below:

Embodiment 1

FIGS. 1-4 show a first embodiment of the leg assembly for a pole. The leg assembly may be fixed on poles such as mountaineering poles or ski poles. The pole comprises a pole body 1. The leg assembly comprises a support leg 2, a snow tray 3 (or a mud tray), and a connecting sleeve 5. The connecting sleeve 5 has multiple elastic limiting clamps 51 at the peripheral surface of the connecting sleeve 5 corresponding to the guiding slots 22, to limit the connecting sleeve 5 with the support leg 2, and each elastic limiting clamp 51 is along with the lengthwise of the connecting sleeve 5. The snow tray 3 is mounted and fixed on the support leg 2. The connecting sleeve 5 is inserted into an upper portion of the support leg 2 in a limiting manner. A bottom of the pole body 1 is inserted into the connecting sleeve 5 and tightly resists against the elastic limiting clamps 51, the elastic limiting clamps 51 will be pushed outward and limited in the guiding slots 22 of the support leg 2 to limit and fix the support leg 2. So that the connecting sleeve 5 with the pole body 1 can move upward and downward relative to the support leg 2. there is a mounting space 100 for the shock absorption spring 7 between the support leg 2 and the connecting sleeve 5, and the support leg 2 has a trend of moving downward due to resistance from the shock absorption spring 7 to release elastic shock absorption.

The specific structure will be described below. The support leg 2 provided as a short rod, and can be divided into three sections, i.e., an upper portion 211, a middle portion and a lower portion 212. The upper portion 211 of the support leg 2 is for receiving the connecting sleeve 5 and positioned with the connecting sleeve 5, and is generally hollow. The lower portion 212 is a grounded section that looks like a sharp corner. In this embodiment, a metal foot 6 is mounted in the lower portion. The middle portion of the support leg 2 has a cylindrical external threaded section 21 connected to the snow tray 3, a cylindrical internal threaded connecting column 31 is extended downward from the center of the snow tray 3 corresponding to the middle portion of the support leg 2, and, the tray is adjustably screwed on the middle portion of the support leg 2. Generally, the support legs of the snow tray 3 are relatively long, so the internal threaded connecting column 31 is located on the lower side of the snow tray 3, and the internal threaded section 32 of the internal threaded connecting column 31 is located near the tray. The upper portion 211 of the support leg 2 has an opening for receiving the connecting sleeve 5, and the connecting sleeve 5 has an inner hole for receiving the bottom of the pole body 1. The diameter of the bottom of the pole body 1 is gradually reduced, the downer the smaller; that is, the bottom of the pole body 1 is in a truncated conical shape; and correspondingly, the diameter of the inner hole of the connecting sleeve 5 is gradually reduced, the downer the smaller. In this way, the bottom of the pole body 1 can be firmly inserted and positioned inside the inner hole of the connecting sleeve 5. The elastic limiting clamps 51, disposed at the middle of the connecting sleeve 5 and arranged along the lengthwise of the support leg 2, are configured to clamp the bottom of the pole body 1. After the bottom of the pole body 1 is inserted into the connecting sleeve 5, the pole body 1 resists against the inner sides of the elastic limiting clamps 51 and is tight limited with the support leg 2 through the connecting sleeve 5. The elastic limiting clamps 51 and the connecting sleeve 5 are integrated. The upper ends of the elastic limiting clamps 51 are connected with the peripheral wall of the connecting sleeve 5. The lower ends of the elastic limiting clamps 51 can be expanded or retracted due to the elasticity of material. Each elastic limiting clamp 51 has a limiting block 53 formed with a slant guiding surface at the bottom of the elastic limiting clamp 51. Of course, the number of the elastic limiting clamps 51 is not limited to two, and there may be three, four or more elastic limiting clamps 51 distributed in the circumferential direction at uniform intervals. Each guiding slot 22 are longitudinally arranged at the upper portion 211 of the support leg 2 and close to the middle portion. The upper portion 211 of the support leg 2 has a truncated cone 23 with an inner step 25a at the inner wall of the upper portion 211 of the support leg 2. The connecting sleeve 5 inserted inside the upper portion 211 of the support leg 2 is limited through resisting against the inner step 25a and the limiting blocks 53 blocked in the corresponding guiding slot 22, so that the connecting sleeve 5 and the support leg 2 can be appropriately connected in a telescopic manner. The connecting sleeve 5 has a circular increased-diameter portion 52 at the top end of the connecting sleeve 5. The inner diameter of the opening on the upper portion 211 of the support leg 2 is matched with the outer diameter of the circular increased-diameter portion 52. That is, the inner diameter of the through hole on the upper portion 211 of the support leg 2 is basically equal to the outer diameter of the increased-diameter portion 52 of the connecting sleeve 5. The support leg 2 has a neck 25 inside the upper portion 211 and at the bottom of the truncated cone 23, forming the inner step 25a, and, the inner diameter of the neck 25 is matched with the outer diameter of the connecting sleeve 5. In this way, the connecting sleeve 5 will not shake after being inserted, so that the structure is stable and reliable. A mounting clearance 100 (generally annular) is formed between the support leg 2 and the connecting sleeve 5. The shock absorption spring 7 is disposed outside the connecting sleeve 5, resisting against between the increased-diameter portion 52 of the connecting sleeve 5 and the inner step 25a of the support leg 2, so that the support leg 2 has a trend to pop out downward, and shock absorption is realized when being used. The upper portion 211 of the support leg 2 has a truncated cone 23 with an increased diameter, and the snow tray 3 is mounted on the support leg 2 through threads. When the snow tray 3 is limited by the lower end face of the truncated-cone structure 23 (that is, when the snow tray is properly connected), the internal threaded section 32 of the snow tray 3 finally goes beyond the external threaded section 21 on the support leg 2 and is disengaged from the external threads on the support leg 2, so that the internal threaded section 23 is located above the middle external threaded section 21 of the support leg 2. In this way, the idling can be realized, and it is difficult for the snow tray 3 to reversely roll out from the support leg 2. Only when the snow tray 3 is reversely rotated due to a downward tension force, the threads can be engaged with each other and the snow tray 3 can reversely roll out due to the action of the threads. Since the snow tray 3 has a relatively large area, reinforcing ribs 34 in a substantially spoke shape are embedded in the snow tray 3, and snow outlets 33 are distributed on the snow tray 3, so that the snow component is easily inserted into snow from being damaged. Additionally, a metal foot 6 having a positioning column is disposed on the bottom of the support leg 2, not a knife-like tip, the support leg 2 has an inserting hole 24 for receiving the positioning column of the metal foot 6 at the bottom of the support leg 2. The convex ring is located below the positioning column. The upper end of the metal foot 6 is inserted into and fixed on the bottom of the support leg 1. With the arrangement of the metal foot 6, the wear resistance is provided to the leg assembly, and the structural strength is improved.

Embodiment 2

FIGS. 5-8 show a second embodiment of the leg assembly with the shock absorption mechanism. The leg assembly of this embodiment differs from Embodiment 1 in that: a mud tray 4 is used. An internal threaded connecting column 41 corresponding to the external threaded section 21 of the support leg 2 is formed in the middle of the mud tray 4 in the leg assembly. The support legs of the mud tray 4 are relatively short, the internal threaded connecting column 41 is located on the upper side of the mud tray 4, and an internal threaded section 42 is formed in the internal threaded connecting column 41. However, the support legs of the snow tray 3 are relatively long, and the internal threaded connecting column 23 is located on the lower side of the snow tray 3. When the mud tray 4 is connected with the support leg 2 through threads and limited by the lower end face of the truncated-cone structure 23 (that is, when the mud tray 4 is properly connected), the internal threaded section 42 of the mud tray 4 finally goes beyond the external threaded section 21 on the support leg 2 and is disengaged from the external threads on the support leg 2, so that the internal threaded section 42 is located above the middle external threaded section 21 of the support leg 2. In this way, the idling can be realized, and the mud tray 4 is not easy to reversely roll out from the support leg 2. Only when the mud tray 4 is reversely rotated due to a downward tension force, the threads can be engaged with each other, and the mud tray 4 can reversely roll out due to the action of the threads. Other structures are similar to those in Embodiment 1.

Embodiment 3

Figure 9:
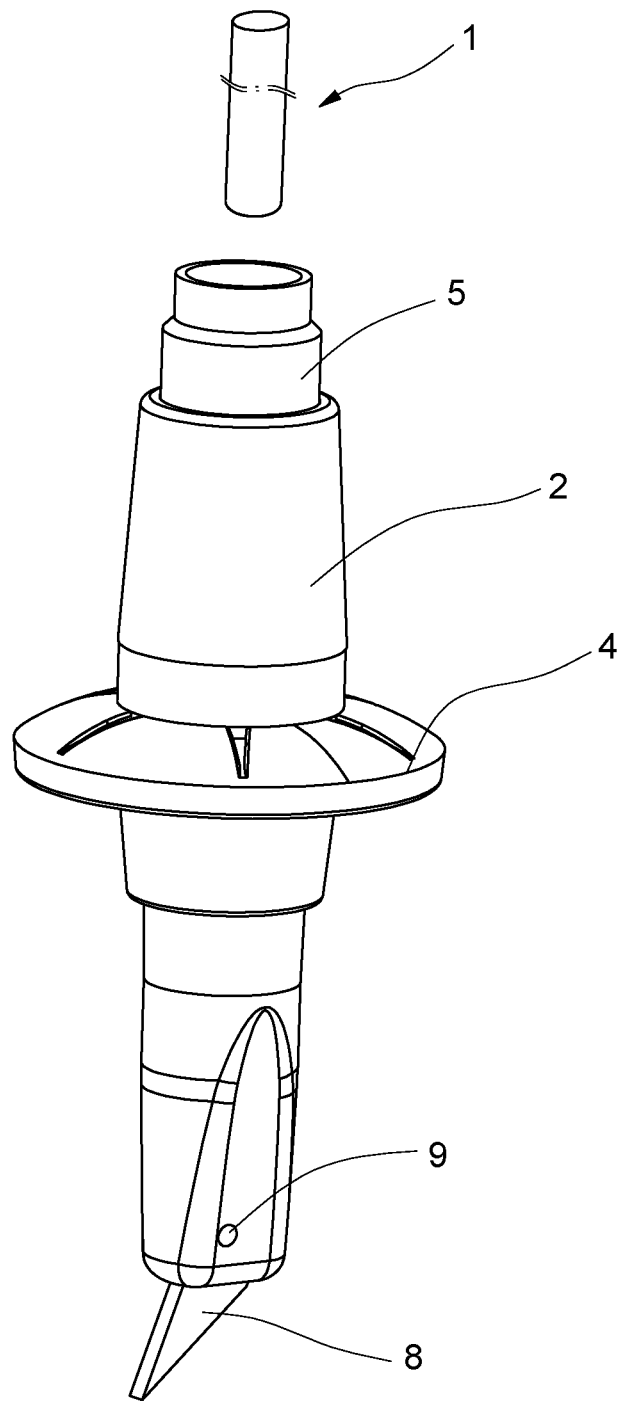
FIG. 9 is a perspective view of a leg assembly according to Embodiment 3 of the present application.
Figure 10:
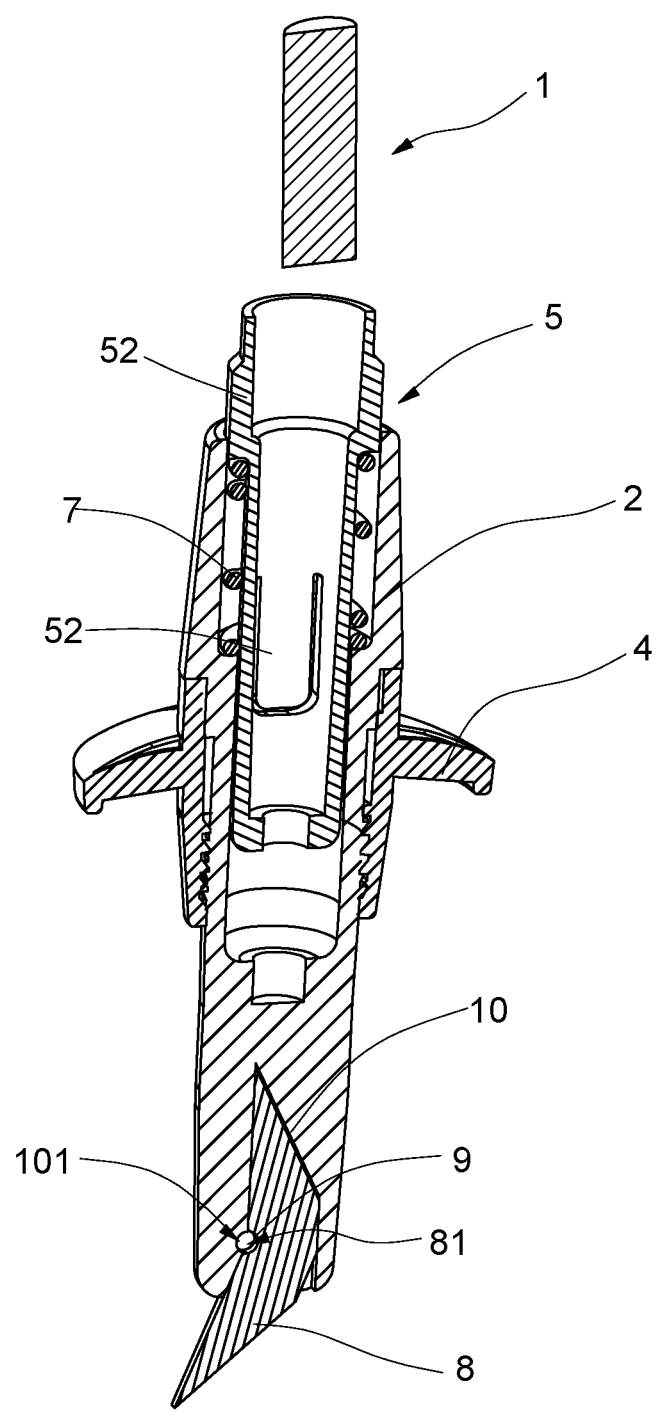
FIG. 10 is a sectional view of FIG. 9.

FIGS. 9-10 show a third embodiment of the leg assembly with the shock absorption mechanism. The leg assembly of this embodiment differs from Embodiment 1 in that: a metal knife-like tip 8 is disposed on the bottom of the support leg 2 with the lower portion of the knife-like tip 8 exposed outside, and the knife-like tip 8 is longitudinally symmetrical. The support leg 2 has a positioning hole 10 for receiving the upper portion of the knife-like tip 8 at the bottom of the support leg 2; the support leg 2 has a pin-hole 101 running through the side wall of the positioning hole 10, while the knife-like tip 8 has a positioning opening 81 in the middle of the knife-like tip 8, and, a pin 9 inserts from the support leg 2 into the pin-hole 101 and the positioning opening 81 so as to fix the knife-like tip 8 with the support leg 2. In this way, when the head of the knife-like tip 8 is worn seriously, the knife-like tip 8 can be detached and then mounted again after being inverted, so that the usage life is prolonged. Other structures are similar to those in Embodiment 1.

Embodiment 4

Figure 11:
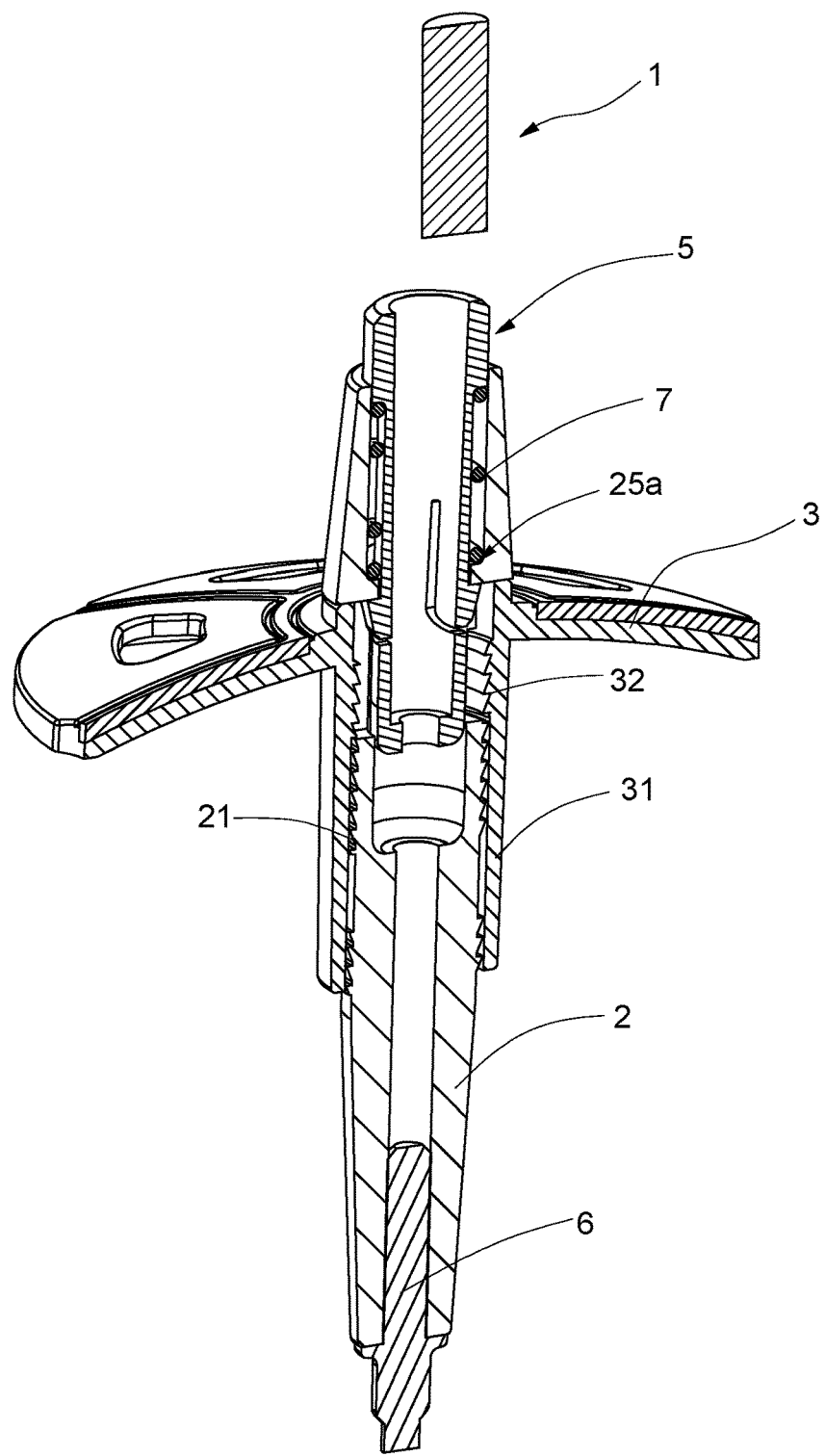
FIG. 11 is a perspective view of a leg assembly with a snow tray according to Embodiment 4 of the present application.
Figure 12:
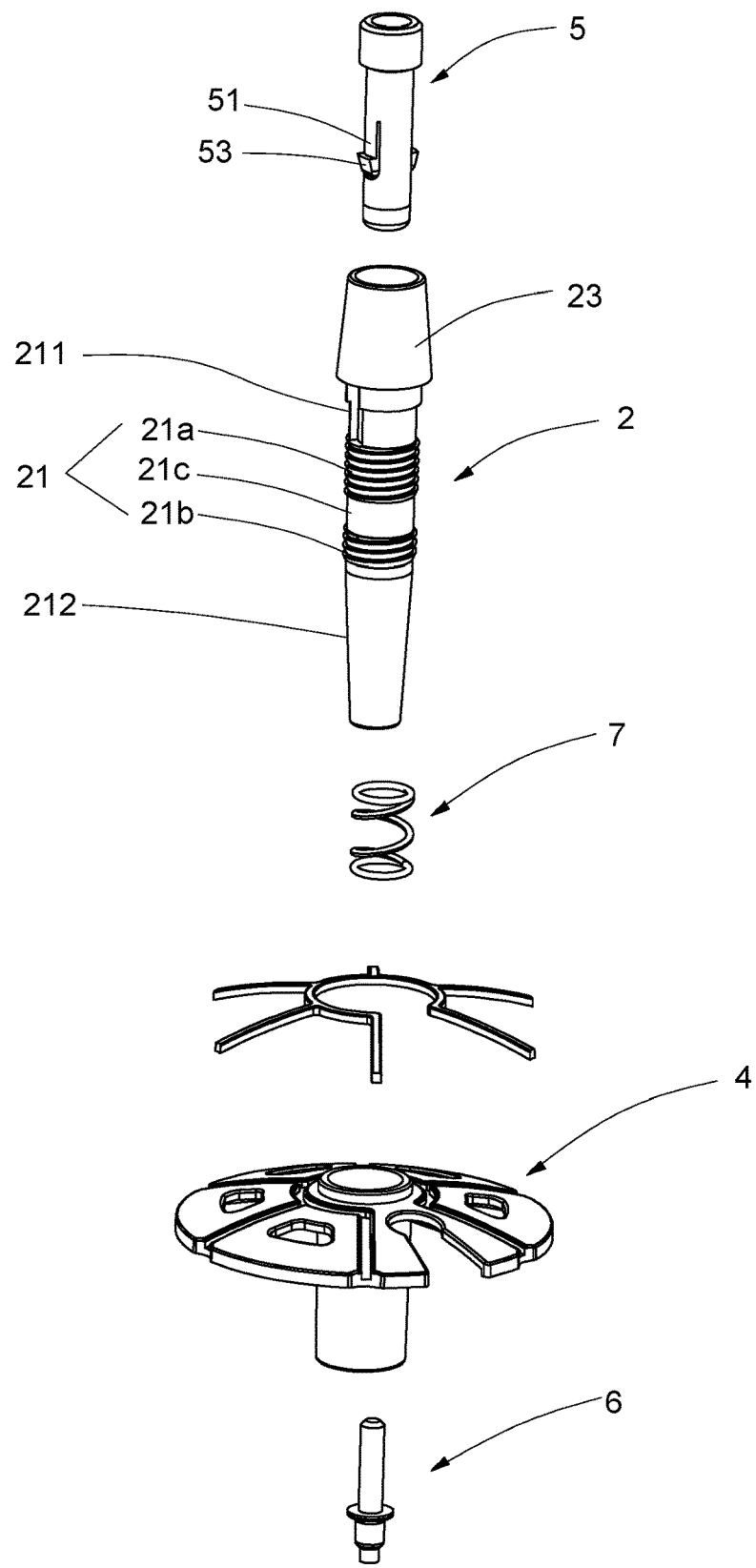
FIG. 12 is an exploded view of the leg assembly with a mud tray according to Embodiment 4.
Figure 13:
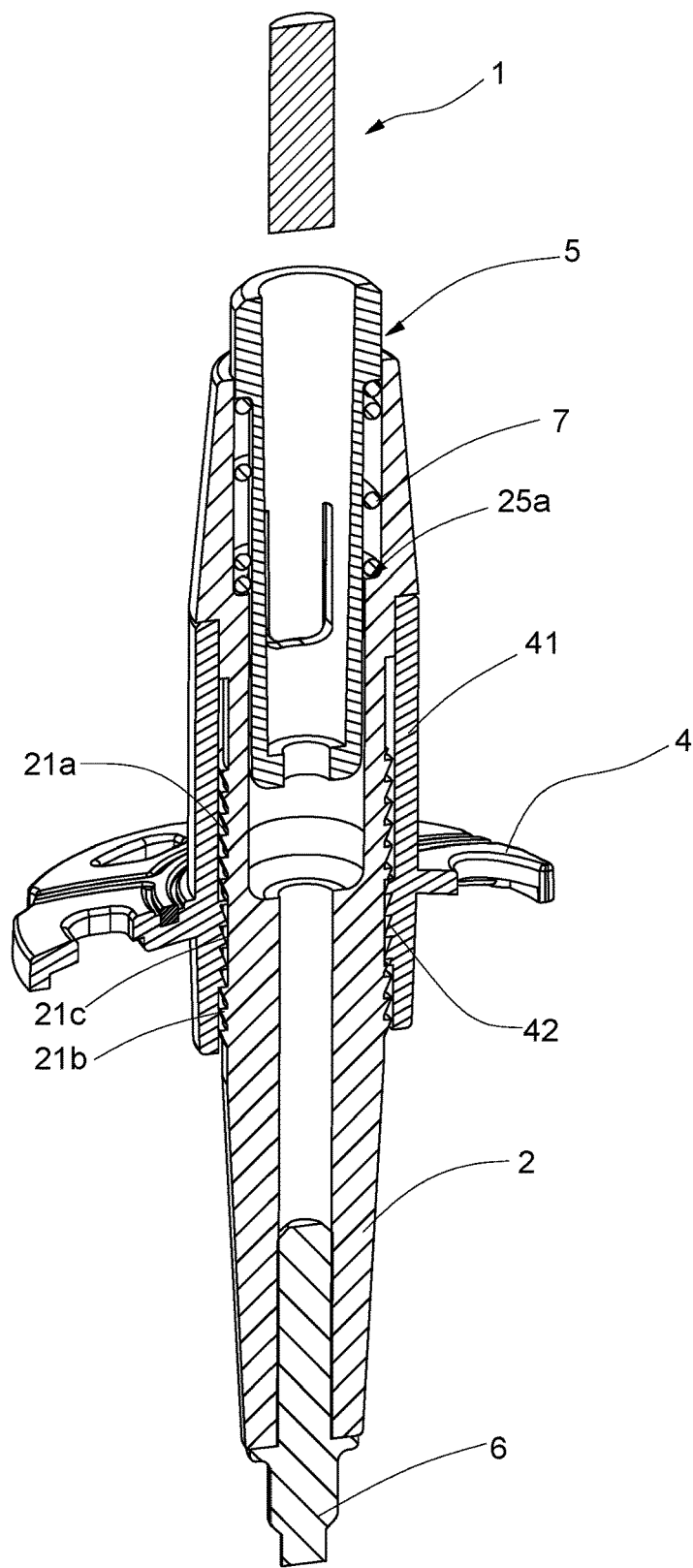
FIG. 13 is a sectional view of the leg assembly with the mud tray according to Embodiment 4.

FIGS. 11-13 show a forth embodiment of the leg assembly with the shock absorption mechanism. The leg assembly of this embodiment differs from Embodiment 1 in that: the middle external threaded section 21 of the support leg 2 includes two sections that may be arranged at intervals, i.e., an upper section 21*a* and a lower section 21*b*. There is a spacing section 21*c* between the upper section 21*a* and the lower section 21*b*. To facilitate the threaded connection and height adjustment of the mud tray 4 or the snow tray 3, the support legs of the snow tray 3 are generally relatively long. Therefore, the internal threaded connecting column 31 is located on the lower side of the snow tray 3, and the internal threaded section 32 of the internal threaded connecting column 31 is located near the tray. However, the support legs of the mud tray 4 are relatively short, the internal threaded connecting column 41 is located on the upper side of the mud tray 41, but the internal threaded section 42 is still located below and near the tray. In this way, when the mud tray 4 is connected with the support leg 2, the internal threaded section 42 of the mud tray 4 is located between the two separated external threaded sections 21 of the support leg 2, so that the idling can be realized, as shown in FIG. 13. However, when the snow tray 3 is connected with the support leg 2, the internal threaded section 32 of the snow tray 3 is located above the two external threaded sections 21 of the support leg 2, so that the idling can be realized, as shown in FIG. 11. Other structures are similar to those in Embodiment 1.

Embodiment 5

Figure 14:
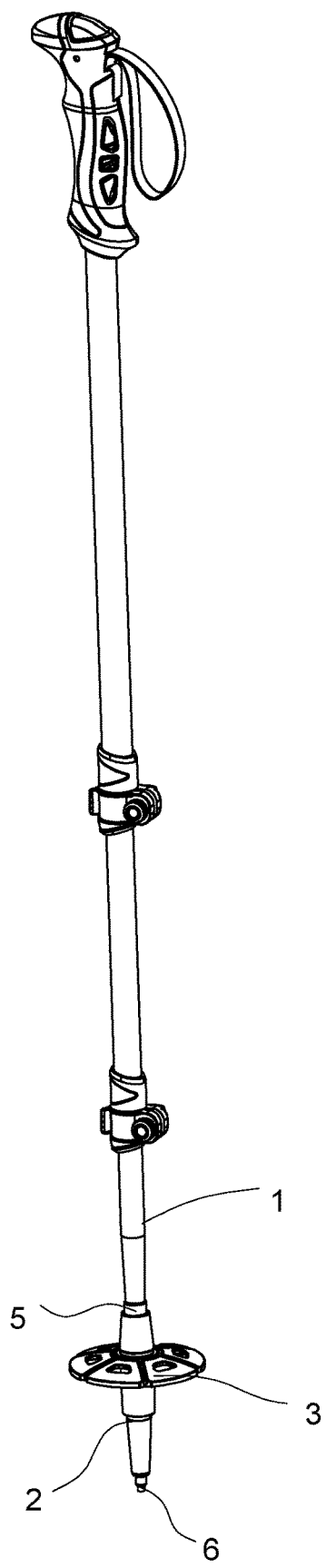
FIG. 14 is a perspective view of a pole with a leg assembly according to Embodiment 5 of the present application.
Figure 15:
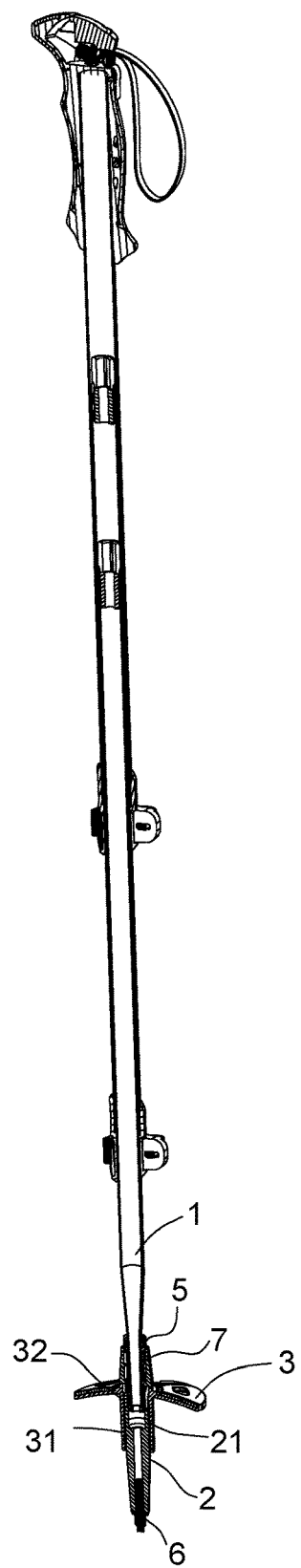
FIG. 15 is a sectional view of FIG. 14.
Figure 16:
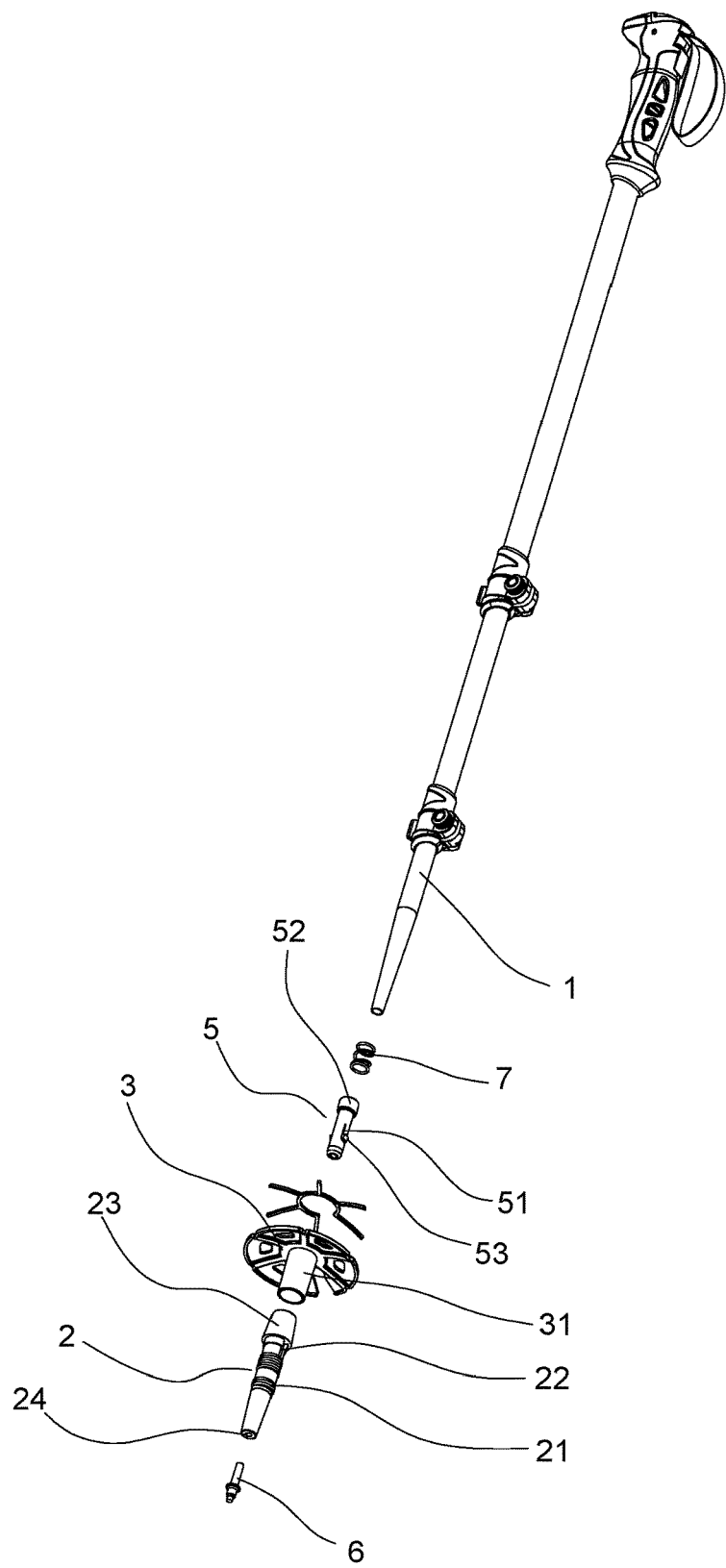
FIG. 16 is an exploded view of FIG. 14.

FIGS. 14-16 show a preferred embodiment of a pole using the leg assembly of the present application, the pole can be used as a mountaineering pole or a ski pole, and so on. The pole comprises a pole body 1 and the leg assembly of the present application. The pole boy 1 can be a conventional aluminum alloy pole or carbon fiber pole, and may be a telescopic pole. An inner pole is arranged in an outer pole, and locked by a locking component. These are all well-known. The key point is that the pole of the present application has a special shock absorption mechanism, which is disposed in the leg assembly. The detailed structure of the leg assembly is similar to Embodiment 1, and the leg assembly in this embodiment differs from Embodiment 1 in that: the middle portion of the support leg 2 has two separated external threaded sections 21, to facilitate threaded connection and height adjustment of the mud tray 4 or the snow tray 3, the support leg of the snow tray 3 are generally relatively long, therefore, the internal threaded connecting column 31 is extended downward from the snow tray 3, and the internal threaded section 32 is near the center of the snow tray 3. In this way, when the snow tray 3 is connected with the support leg 2, the internal threaded section 32 of the snow tray 3 is located above the two external threaded sections 21 of the support leg 2, so that the snow tray 3 can idle, as shown in FIG. 15. When the bottom of the pole body 1 is inserted into the connecting sleeve 5 and clamped by the elastic limiting clamps 51, and the shock on support leg 2 can be absorbed by the shock absorption spring 7 disposed between the connecting sleeve 5 and the support leg 2, rather than transmitting through the pole body 1. The connecting sleeve 5 with the elastic limiting clamps 51 forms the shock absorption mechanism with the shock absorption spring 7.

The specific assembly process will be described below. The metal foot 6 or the knife-like tips 8 are positioned and fixed on the bottom of the support leg 2, the snow tray 3 or the mud tray 4 is mounted on the middle portion of the support leg 2 through threads, and the shock absorption spring 7 is mounted on the connecting sleeve 5. The connecting sleeve 5 is aligned with and inserted into the through hole at the upper end of the support leg 2, so that the elastic limiting clamps 51 are aligned with and positioned in the elongated slots 22. When a bottom of the pole body 1 is inserted into the connecting sleeve 5 and tightly resists against the elastic limiting clamps 51, the elastic limiting clamps 51 will be pushed outward and engaged in the guiding slots 22 of the support leg 2 to limit and fix the support leg 2. Thus, the connecting sleeve 5 with the pole body 1 can move upward and downward relative to the support leg 2 through the elastic limiting clamps 51.

When in use, due to the arrangement of the shock absorption spring 7, the shock is reduced effectively, and the use comfort is improved. Moreover, no holes need to be formed on the tube of the pole body 1, so the processing steps are reduced. It is convenient to process, the manufacturing cost is reduced, and the strength of the tube is improved. The whole shock absorption mechanism is light, so the weight of the pole is reduced, and the user's comfort in use is improved. It is convenient to be assembled, and suitable for being popularized in various pole structures.

The best implementation of the shock absorption mechanism for a pole has been disclosed in this embodiment. However, it should not be regarded as limiting the protection scope of the present application. All replacements using equivalent or similar technical means to realize rotation shall fall into the protection scope of the present application.

What is claimed is:

1. A leg assembly for a pole, comprising:
    a support leg (2), having an upper portion (211), a middle portion and a lower portion (212),
    a tray (3;4), surrounding the support leg (2);
    a connecting sleeve (5), for connecting a pole body (1) inserting from a top of the support leg (2); and
    a shock absorption spring (7), surrounding the connecting sleeve (5) and resisting against the connecting sleeve (5) and the support leg (2);
    wherein the upper portion (211) of the support leg (2) is hollow and has a plurality of guiding slots (22) at a peripheral surface of the support leg (2) which arranged along a lengthwise direction of the support leg (2);
    the connecting sleeve (5) has a plurality of elastic limiting clamps (51) at a peripheral surface of the connecting sleeve (5) corresponding to the guiding slots (22), to limit the connecting sleeve (5) with the support leg (2);
    the shock absorption spring (7) is located in a mounting space (100) between the support leg (2) and the connecting sleeve (5), and the support leg (2) has a trend of moving downward due to resistance from the shock absorption spring (7);
    when a bottom of the pole body (1) is inserted into the connecting sleeve (5) and tightly resists against the elastic limiting clamps (51), the elastic limiting clamps (51) are pushed outward and limited in the guiding slots (22) of the support leg (2), and the connecting sleeve (5) with the pole body (1) is allowed to move upward and downward relative to the support leg (2).

2. The leg assembly of claim 1, wherein the upper portion (211) of the support leg (2) is configured to receive the connecting sleeve (5) and positioned with the connecting sleeve (5), a lower portion (212) of the support leg (2) is a grounded section, and the middle portion of the support leg (2) has a cylindrical external threaded section (21) connected to the tray (3;4);
    a cylindrical internal threaded connecting column (31;41) is extended from a center of the tray (3;4) corresponding to the middle portion of the support leg (2), and, the tray is adjustably screwed on the middle portion of the support leg (2).

3. The leg assembly of claim 2, wherein the upper portion (211) of the support leg (2) has an opening for receiving the connecting sleeve (5), the connecting sleeve (5) has an inner hole for receiving the bottom of the pole body (1);
    and the elastic limiting clamps (51), each arranged along the lengthwise of the support leg (2), are configured to clamp the bottom of the pole body (1).

4. The leg assembly of claim 3, wherein the connecting sleeve (5) has two elastic limiting clamps (51) symmetrically arranged at a middle of the connecting sleeve (5), and the support leg (2) has two guiding slots (22).

5. The leg assembly of claim 4, wherein each elastic limiting clamp (51) has a limiting block (53) arranged at a bottom of the elastic limiting clamp (51) with a slant guiding surface;
    each guiding slot (22) are longitudinally arranged at the upper portion (211) of the support leg (2) and close to the middle portion;
    the upper portion (211) of the support leg (2) has a truncated cone (23) with an inner step (25a) at an inner wall of the upper portion (211) of the support leg (2);
    and the connecting sleeve (5) inserted inside the upper portion (211) of the support leg (2) is limited through resisting against the inner step (25a) and the limiting blocks (53) blocked in the corresponding guiding slot (22).

6. The leg assembly of claim 5, wherein the connecting sleeve (5) has a circular increased-diameter portion (52) at a top end of the connecting sleeve (5);
    an inner diameter of the opening on the upper portion (211) of the support leg (2) is matched with an outer diameter of the circular increased-diameter portion (52);
    the support leg (2) has a neck (25) inside the upper portion (211) and at a bottom of the truncated cone (23), forming the inner step (25a), and, an inner diameter of the neck (25) is matched with an outer diameter of the connecting sleeve (5).

7. The leg assembly of claim 6, wherein the shock absorption spring (7) is outside the connecting sleeve (5), resisting against between the increased-diameter portion (52) of the connecting sleeve (5) and the inner step (25a) of the support leg (2).

8. The leg assembly of claim 2, wherein the tray includes a snow tray (3) and a mud tray (4);
    the middle portion of the support leg (2) has only one external threaded section (21) to facilitate threaded connection and height adjustment of the mud tray (4) or the snow tray (3);
    and, the internal threaded connecting column (31;41) of the snow tray (3) and the mud tray (4) has an internal threaded section (32;42), when the mud tray (4) or the snow tray (3) is connected with the support leg (2), the internal threaded section (32;42) of the mud tray (4) or the snow tray (3) is located above the external threaded section (21) of the support leg (2).

9. The leg assembly of claim 2, wherein the tray includes a snow tray (3) and a mud tray (4);
the middle portion of the support leg (2) has two separated external threaded sections (21) to facilitate threaded connection and height adjustment of the mud tray (4) or the snow tray (3);
and, the internal threaded connecting column (31;41) of the snow tray (3) and the mud tray (4) has an internal threaded section (32;42), when the mud tray (4) is connected with the support leg (2), the internal threaded section (42) of the mud tray (4) is located between the two separated external threaded sections (21) of the support leg (2);
and, when the snow tray (3) is connected with the support leg (2), the internal threaded section (32) of the snow tray (3) is located above the two external threaded sections (21) of the support leg (2).

10. The leg assembly of claim 1, wherein the diameter of the bottom of the pole body (1) is gradually reduced; and correspondingly, the diameter of the inner hole of the connecting sleeve (5) is gradually reduced.

11. The leg assembly of claim 1, wherein a metal foot (6) having a positioning column is disposed on the bottom of the support leg (2), the support leg (2) has an inserting hole (24) for receiving the positioning column of the metal foot (6) at the bottom of the support leg (2); and, the positioning column on the top of the metal foot (6) is inserted inside the inserting hole (24) of the support leg (2).

12. The leg assembly of claim 1, wherein a metal knife-like tip (8) is disposed on the bottom of the support leg (2) with the lower portion of the knife-like tip (8) exposed outside, the support leg (2) has a positioning hole (10) for receiving an upper portion of the knife-like tip (8) at the bottom of the support leg (2);
the support leg (2) has a pin-hole (101) running through the side wall of the positioning hole (10), while the knife-like tip (8) has a positioning opening (81) in a middle of the knife-like tip (8), and, a pin (9) inserts from the support leg (2) into the pin-hole (101) and the positioning opening (81) to fix the knife-like tip (8) with the support leg (2).

13. The leg assembly of claim 12, wherein the knife-like tip (8) is longitudinally symmetrical.

14. A shock absorption mechanism for a pole, comprising a pole body (1) and the leg assembly of claim 1;
wherein a bottom of the pole body (1) is inserted into the connecting sleeve (5) and clamped by the elastic limiting clamps (51), and the shock absorption spring (7) disposed between the connecting sleeve (5) and the support leg (2) is configured to absorb shock on the support leg (2).

* * * * *